United States Patent

Kray et al.

[15] 3,666,723
[45] May 30, 1972

[54] POLYIMIDES FROM 2,6-DIAMINO-S-TRIAZINES AND DIANHYDRIDES

[72] Inventors: Raymond J. Kray, Berkeley Heights, N.J.; Roland A. E. Winter, Armonk, N.Y.

[73] Assignee: Ciba-Geigy Corporation

[22] Filed: Aug. 1, 1969

[21] Appl. No.: 889,017

[52] U.S. Cl. .................. 260/65, 117/124 E, 117/126 GR, 117/128.4, 117/132 C, 117/138.8 D, 117/138.8 E, 117/138.8 UF, 117/145, 117/148, 117/155 R, 161/197, 161/214, 161/227, 260/29.2 N, 260/30.2, 260/30.6 R, 260/30.8 R, 260/30.8 DS, 260/32.2, 260/32.6 N, 260/32.8 N, 260/37 N, 260/47 CP, 260/78 TF

[51] Int. Cl. .......................................... C08g 20/32

[58] Field of Search ............ 260/47 P, 65, 78 TF, 78.4, 260/249.5, 249.6

[56] References Cited

UNITED STATES PATENTS

| 3,179,630 | 4/1965 | Endrey | 260/78 |
| 3,342,774 | 9/1967 | Hoegger | 260/47 |
| 3,448,080 | 6/1969 | Hirsch | 260/65 |
| 3,528,937 | 9/1970 | Reynolds et al. | 260/29.2 |

*Primary Examiner*—William H. Short
*Assistant Examiner*—L. L. Lee
*Attorney*—Karl F. Jorda, Bruce M. Collins, Martin J. Spellman and Nestor W. Shust

[57] ABSTRACT

Triazine-based polyimides are prepared by first reacting dianhydrides with s-triazine compounds containing at least two primary aromatic, aliphatic or cycloaliphatic amino groups to give triazine-based polyamic acids which, on curing, yield the polyimides. The polyamic acids are soluble in organic solvents or ammonium hydroxide, the latter yielding the aqueous solutions. From said organic or aqueous solutions useful fibers, films, adhesives, coatings and composites can be prepared. The triazine-based polyimides possess high temperature oxidative stability, good mechanical properties and electrical properties and low void contents.

7 Claims, No Drawings

POLYIMIDES FROM 2,6-DIAMINO-S-TRIAZINES AND DIANHYDRIDES

DETAILED DISCLOSURE

The polyimides of this invention are characterized by a recurring unit having the following structural formula:

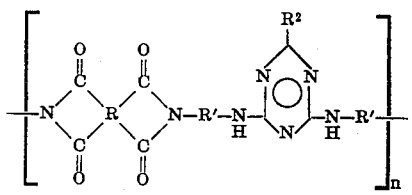

wherein

R is a tetravalent radical containing at least one ring of six carbon atoms, said ring characterized by benzenoid unsaturation, the four carbonyl groups being attached directly to separate carbon atoms in a six membered benzenoid ring of the R radical and each pair of carbonyl groups being attached to adjacent carbon atoms in a ring of the R radical;

R' is a divalent organic radical selected from aromatic, aliphatic and cycloaliphatic series;

$R^2$ is hydrogen, amino, diarylamino, di(lower)alkyl amino, anilino, N-(lower)alkyl anilino, diphenylamino, pyrrolidino, piperidino, phenyl or chloro groups;

n is an integer of 5 or more.

The (lower)alkyl group employed herein means a straight, or branched chain alkyl group having up to four carbon atoms. Examples of such groups are methyl, ethyl, propyl, isopropyl, butyl and the like.

The polyimides of the present invention have high tensile properties, exceptional stability to heat and water and good electric properties. Thus, these polyimides are particularly useful as shaped structures such as films, fibers, filaments and composites with reinforcing agents such as glass fabrics, graphites and boron fibers.

The starting materials employed in the preparation of the polyimides of this invention are s-triazine compounds containing two primary aryl, alkyl and cycloalkyl amino groups and aromatic tetracarboxylic acid anhydrides. The triazine based diamines are characterized by the formula:

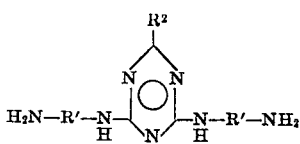

wherein

R' and $R^2$ are as defined above. More specifically, R' is selected from the following groups:
a. ortho, meta and para phenylene, biphenylene, naphthylene, anthrylene
b.

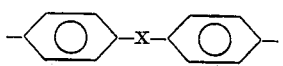

wherein X is sulfur, oxygen, sulfone, methylene or alkyl or aryl substituted methylene groups c. alkylene groups having from two to eight carbon atoms, and
d. cycloalkyl groups, such as cyclopentyl, cyclohexyl and the like.

The blocking group $R^2$ mentioned above can be hydrogen, phenyl or an amino group illustrated below:

—$NH_2$, dialkylamino groups such as, dimethylamino, diethylamino, dipropylamino, diisopropylamino, dibutylamino and the like, pyrrolidino, piperidino, anilino, N-(lower)alkyl anilino compounds such as N-methyl anilino, N-ethyl anilino, N-butyl anilino, N-arylanilino compounds such as diphenylamino, N-naphthyl anilino, phenyl, and the like.

The following s-triazine compounds exemplify a few types of diamines that can be employed in preparing the polyimides of this invention.

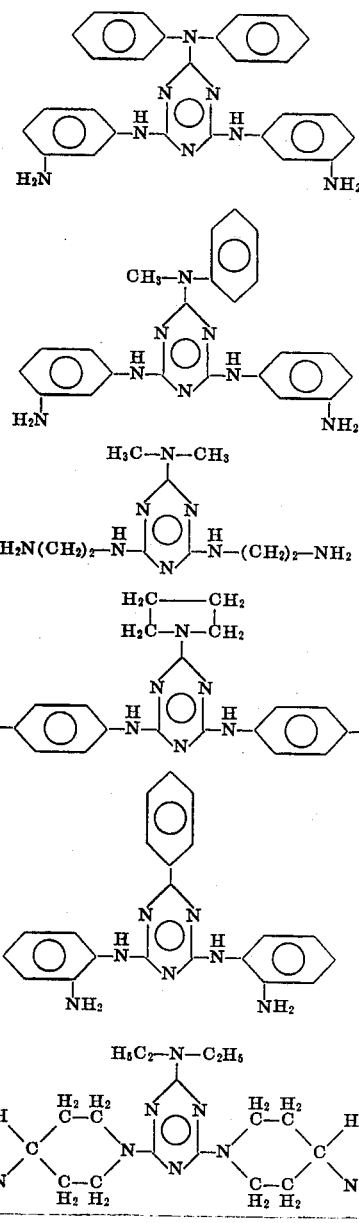

The s-triazine diamines discussed above generally have higher molecular weights than the diamines employed in preparing the prior art polyimides. This imparts an important advantage to the s-triazine based polyimides over the prior art polyimides since the polyamic acids of this invention evolves, on a weight basis, less water of condensation during the formation of polyimides. This water of condensation has a tendency to be entrapped in the polyimide resins causing voids, which usually open during a high temperature use providing additional surface for oxidative attack. For this reason it is desirable to keep the water of condensation to a minimum. In the prior art polyimides the water of condensation is usually about 9 percent on a weight basis. In the s-triazine polyimides substantially less water is evolved, generally about 5 percent or less. Thus the thick moldings and composites of low void content are more readily prepared by employing the s-triazine polyimides of this invention.

The dianhydrides useful in this invention are characterized by the general formula:

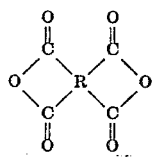

wherein the tetravalent radical

is as heretofore defined and may be selected from the following general groups: aromatic, aliphatic, cycloaliphatic, hererocyclic, combinations of aromatic and aliphatic, and substituted groups thereof. The R groups may be characterized by the following structures:

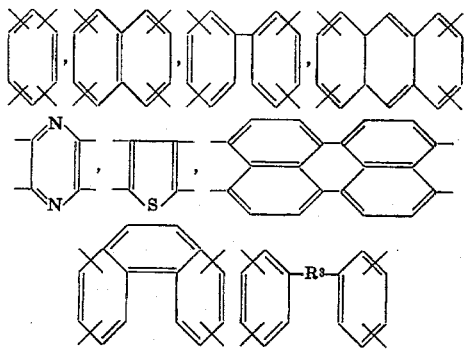

wherein R³ is selected from the group consisting of —O—,

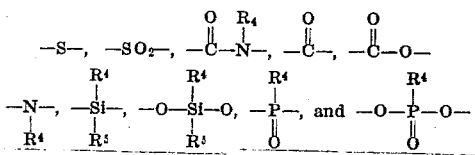

wherein R⁴ and R⁵ are alkyl or aryl, and substituted groups thereof.

In these dianhydrides every carbonyl group is attached directly to a separate carbon atom of the aromatic radical, the carbonyl groups being ortho or peri to each other so that the five or six membered anhydride rings are formed respectively.

The preferred aromatic dianhydrides are those in which the carbon atoms of each pair of carbonyl groups are directly attached to ortho carbon atoms in the R group to provide a five-membered ring as follows:

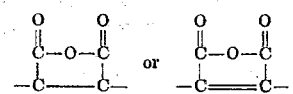

The following species are typical of tetracarboxylic acid dianhydrides suitable for practicing the invention:

3,3,9,10-perylene tetracarboxylic dianhydride
1,4,5,8-naphthalene tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
2,3,3,',4'-benzophenone tetracarboxylic dianhydride
Pyromellitic dianhydride
3,3',4,4'-benzophenone tetracarboxylic dianhydride
2,2',3,3'-benzophenone tetracarboxylic dianhydride
3,3',4,4'-diphenyl tetracarboxylic dianhydride
2,2',3,3'-diphenyl tetracarboxylic dianhydride
2,2-bis-(3,4-dicarboxyphenyl)propane dianhydride
2,2-bis-bis(2,3-dicarboxyphenyl)propane dianhydride
bis-(3,4-dicarboxyphenyl)ether dianhydride
bis-(3,4-dicarboxyphenyl)sulfone dianhydride
1,1-bis-(2,3-dicarboxyphenyl)ether dianhydride
1,1-bis-(3,4-dicarboxyphenyl)ether dianhydride
bis-(2,3-dicarboxyphenyl)methane dianhydride
bis-(3,4-dicarboxyphenyl)methane dianhydride
2,3,6,7-naphthalene tetracarboxylic dianhydride
1,2,4,5-naphthalene tetracarboxylic dianhydride
1,2,5,6-naphthalene tetracarboxylic dianhydride
benzene-1,2,3,4-tetracarboxylic dianhydride
pyrazine-2,3,5,6-tetracarboxylic dianhydride
thiophene-2,3,4,5-tetracarboxylic dianhydride, and dianhydrides having the general structure:

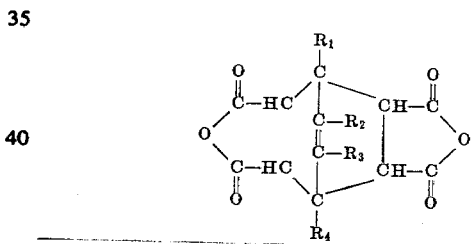

where $R_1$—, $R_2$—, $R_3$— and $R_4$— are each members selected from hydrogen, alkyl, aryl, and aralkyl.

The polyimides are prepared by a process comprising reacting the above described s-triazine diamines with dianhydrides in an organic reaction medium which is a solvent for at least one of the reactants, preferably under substantially anhydrous conditions, at a temperature below 100° C. The product of this reaction is a polyamic acid represented by the following general formula:

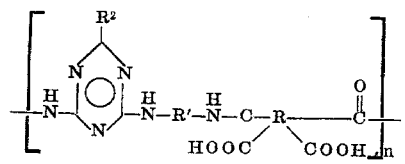

More specifically the reaction can be carried out conveniently in a number of ways. The s-triazine diamine and the dianhydride can be premixed as dry solids in equimolar amounts and the resulting mixture can be added, in small portions and with agitation, to the organic solvent. This method is particularly effective in reactions which are relatively exothermic. However, it is also possible to add slowly with agitation the solvent to the premixed reactants. Another variation is to dissolve the s-triazine diamine in the solvent and then add thereto the dianhydride at a rate that provided a controllable rate of reaction. It is also possible to add the reactants separately and in small portions to the solvent or to dissolve the reactants in separate portions of the solvent and then slowly adding the two solutions to the reaction vessel.

The degree of polymerization of the polyamide acid is subject to deliberate control. The use of equal molar amounts of the reactants under the prescribed conditions provides polyamide acids of very high molecular weight. The use of either reactant in large excess limits the extent of polymerization. However, the scope of the process encompasses the use of up to 5 percent excess of either the diamine or the dianhydride. More than 5 percent excess of either reactant results in an undesirably low moleculer weight polyamic acid. For some purposes, it is desirable to use 1-3 percent excess of either reactant, preferably the dianhydride. Besides using an excess of one reactant to limit the molecular weight of the polyamic acid, a chain terminating agent such as phthalic anhydride or aniline may be used to "cap" the ends of the polymer chains.

In the preparation of the polyamic acid intermediate, it is essential that the molecular weight be such that the inherent viscosity of the polyamic acid is at least 0.1, preferably 0.3-5.0. The inherent viscosity is measured at 30° C. at a concentration of 0.5 percent by weight of the polymer is a suitable solvent, e.g., N,N-dimethylacetamide, N-methyl pyrrolidone, dimethyl formamide, etc. To calculate inherent viscosity, the viscosity of the polymer solution is measured relative to that of the solvent alone.

Inherent viscosity =

$$\frac{\text{Natural logarithm} \times \frac{\text{Viscosity of solution}}{\text{Viscosity of solvent}}}{C}$$

wherein $C$ is the concentration expressed in grams of polymer per 100 milliliters of solution. As known in the polymer art inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60 percent of the polymeric solution. That is, the solution should contain 0.05-40 percent of the polymeric component. The viscous solution of the polymeric composition containing 10 to 40 percent polyamic acid in the polymeric component dissolved in the solvent may be used as such for forming shaped structures.

The shaped articles containing the polyamic acid are then converted to the respective polyimide shaped articles. It should be understood that the conversion process to be described also apply to compositions containing salt derivatives of polyamic acids, e.g., the ammonium or triethyl ammonium salt of the polyamic acids, instead of the polyamic acids themselves.

The solvents useful in the solution polymerization process for synthesizing the intermediate polyamic acid compositions in the process of preparing the polyimides are the organic solvents whose functional groups do not react with either of the reactants (the diamines or the dianhydrides) to a greater extent than the reactants, preferably for both of the reactants. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide acid shaped articles by evaporation, displacement or diffusion. Other typical compounds of this useful class of solvents are:
N,N-diethylformamide
N,N-diethylacetamide
N,N-dimethylmethoxy acetamide
N-methyl caprolactam, etc.

Other solvents which may be used in the present invention are:
dimethylsulfoxide
N-methyl-2-pyrrolidone
tetramethyl urea
pyridine
dimethylsulfone
hexamethylphosphoramide
tetramethylene sulfone
formamide
N-methylformamide
butyrolactone.

The solvents can be used alone, in combinations of solvents, or in combination with poor solvents such as benzene, benzonitrile, dioxane, xylene, toluene and cyclohexane.

To determine a specific time and a specific temperature for forming the polyamide acid of one of the specified diamines and a specified dianhydride, several factors must be considered. The maximum permissible temperature will depend on which of the two diamines is used, the dianhydride used, the particular solvent, the percentage of polyamic acid desired in the final composition and the minimum period of time that one desired for the reaction. For most combinations of meta-phenylenediamine or para-phenylenediamine s-triazine derivatives and the dianhydrides falling within the definitions given above, it is possible to form compositions of 100 percent polyamic acid by conduction the reaction below 100° C. However, temperatures up to 175° C. may be tolerated to provide shapeable compositions. However, to obtain the maximum inherent viscosity, i.e., maximum degree of polymerization, for any particular combination of s-triazine diamine, dianhydride, solvent, etc., and thus produce shaped articles such as films and filaments of optimum toughness, it has been found that the temperature throughout the reaction should be maintained below 60° C., preferably below 50° C.

The polyamic acid prepared as described above can be isolated by evaporating the solvent at temperatures lower than 70° C. The polyamic acid is soluble in organic solvents and in ammonium hydroxide to give a water soluble solution. Accordingly, the polyimides of this invention can be obtained both from an organic or from an aqueous medium. The availability of both of these mediums from which triazine based polyimides can be obtained represents a very important advantage for obtaining high temperature polyimide films and coatings.

The polyamic acid may be converted to polyimide by a variety of methods. One method comprises converting the polyamic acid by heating it above 50° C. Heating serves to convert pairs of amide and carboxylic acid groups to imide groups. Heating may be conducted for a period of a few seconds to several hours. It has been found that after the polyamide acid has been converted to the polyimide in accordance with the above described heat conversion, if the polyimide is further heated to a temperature of 300°–500° C. for a short period, improvements in the thermal and hydrolytic stabilities of the polyimide are obtained.

A second method for converting the polyamic acid composition to the polyimide thereof is a chemical treatment and involves treating the polyamic acid composition with a dehydrating agent alone or in combination with a tertiary amine, e.g., acetic anhydride or an acetic anhydride-pyridine mixture. The polyamic acid shaped article can be treated in a bath containing acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. Other possible dehydrating agents for use include propionic anhydride, butyric anhydride, valeric anhydride and mixed lower fatty-acid anhydrides. Other tertiary amine catalysts include triethylamine, isoquinoline, $\alpha,\beta$ or gamma-picoline, 2,5-lutidine, etc.

A third method for conversion involves treatment with a carbodiimide, e.g., dicylohyxylcarbodiimide. The carbodiimide also serves to dehydrate the polyamic-acid and to act as an effective cyclyzing agent.

As a fourth method of conversion, a combination treatment may be used. The polyamic acid may be partially converted to the polyimide in a chemical conversion treatment and then cyclization to the polyimide may be completed by subsequent heat treatment. The conversion of the polyamic acid to the polyimide in the first step should not exceed 50 percent if it is desired to shape the composition into suitable forms. After shaping, the completion of the cyclization of the polyimide/polyamic acid may be accomplished.

It should be understood that instead of shaping the polyamic acid composition into the usual articles, the polyamic acid composition in the solvent may be used as a liquid coating composition. Such coating compositions may be pigmented with such compounds as titanium dioxide in amounts of 5–200 percent by weight. These coating compositions may be applied to a variety of substrates, for example, metals, e.g., copper, brass, aluminum, steel, etc., the metals in the form of sheets, fibers, wires, screening, etc.; glass in the form of sheets fibers, foams, fabrics, etc.; polymeric materials, e.g., cellulosic materials such as cellophane, wood, paper etc., polyolefins such as polyethylene, polypropylene, polystyrene, etc., perfluorocarbon polymers such as, polytetrafluoroethylene, copolymer of tetrafluoroethylene with hexafluoropropylene, etc., polyurethanes, all polymeric materials in the form of sheets, fibers, foams, woven and non-woven fabrics, screening, etc.; leather sheets; etc. The polyamic acid coatings are then converted to polyimide coatings by one or more of the processes to be described.

The polyimides of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties at room temperature, but retain their strength and excellent response to workloading at elevated temperatures for prolonged periods of time. Behavior of this type offers commercial utility in a wide range of end uses. These polyimide polymers display excellent resistance to strong acids and alkalies, to corrosive atmospheres, outstanding resistance to degradation by high energy particles and gamma ray radiation. The polymer resists melting upon exposure at 500° C. for extended periods while retaining hitherto unrealized high proportions of room temperature physical properties. Because of the unusual and surprising solubility of the polymer precursor in the process of preparation, this polymer precursor may be processed into shaped articles such as films and fibers by conventional techniques and then converted in situ to the polyimide polymer. Solutions of the s-triazine containing polyamic acids can be used to impregnate reinforcing fibers and fabrics like glass, boron, metal oxide whiskers and graphite. These prepregs can then be cured to form rigid polyimide laminates or composites or to form strong thermally resistant structural adhesive bonds between aluminum, stainless steel, titanium or other metals.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, decorative trim, high temperature electrical insulation such as for slot liners, in dry transformers, capacitors, cable wrappings, etc., packaging of items to be exposed to high temperature or high energy radiation while within the package, corrosion-resistant pipe, duct work, containers and container linings, and laminating structures where the films are bonded to the sheet metal or foils, and a variety of other similar and related uses. In fiber form, the polymer offers possibilities for high temperature electrical insulation, protective clothing and curtains, filtration media, packing and gusseting materials, brake linings and clutch facings.

The particular advantage of the triazine-based polyimides of this invention is that the polyamic acid is soluble in ammonium hydroxide to give aqueous solutions. This advancement is of great importance for a number of reasons. First of all, by employing the polyimides of this invention it is possible to form the desired films, fibers or other articles from the aqueous solutions and thus avoid the undesirable air pollution problems which are ever present when organic solvents are employed. This also provides an economic advantage since the organic solvents are more expensive than water.

The polyimides of this invention have a high nitrogen content from the s-triazine ring and therefore are also useful as ablative heat-shield materials. This stems from the fact that chars containing interstitial nitrogen atoms have lower thermal conductivity than graphite or carbon.

Furthermore, the insertion of the s-triazine ring into the polyimide chains increases the glass transition, Tg. of the polymer. This makes it possible for the s-triazine polyimides to be used at higher temperatures than the prior art polyimides. Since at temperatures above the transition temperature the polymers lose their stiffness and mechanical properties, any increase in transition temperature is of great importance. The presence of s-triazine in the polyimide chains also gives the resin greater stiffness than is obtainable with the known polyimides. The improvement of this property is important since stiffness at high temperatures is required in laminates and composites used in structural parts such as in supersonic aircraft.

To further illustrate the nature of this invention and the process employed in preparing the triazine-based polyimides, the following examples are presented below.

EXAMPLE 1

To a 300 ml flask equipped with a stirrer and $CaCl_2$ tube, 8.41 g., (0.025 moles) of 2-dimethylamino-4,6-bis(m-aminoanilino)-s-triazine dissolved in 94 ml of dry dimethyl acetamide was added. Benzophenone tetracarboxylic dianhydride (BTDA), 8.06 g (0.025 moles) was slowly added to the stirred solution. A mild exotherm to 35° C. was noted and a viscous solution was produced.

A 10 mil film from the solution was cast on aluminum foil and placed in an air circulation oven at 25° C. The oven was heated to 300° C. in 45 minutes. The coated foil was then removed from the oven and placed in a hydrochloric acid solution to dissolve the aluminum. The polyimide film was washed with water and dried.

The polyimide film was repeatedly flexed and creased without breaking. It charred but did not burn in a flame. A thermal gravimetric analysis (TGA) in air showed good thermal stability without weight loss up to 425° C. The film had an initial tensile strength of 14,450 psi. and modulus of 363,000 psi. After 1 week of aging at 300° C. in air the tensile strength was 16,230 psi and modulus 492,000 psi.

EXAMPLE 2

A 300 ml reaction vessel equipped as in Example 1, was charged with 8.41 g (0.025 moles) of 2-dimethylamino-4,6-bis(m-aminoanilino)-s-triazine and 85 ml of dry dimethyl acetamide. Solid pyromellitic dianhydride 5.45 g (0.025 moles) was added slowly to this stirred solution as the reaction temperature increased, but was not allowed to exceed 35° C. After solution was complete the reaction mixture was concentrated under vacuum at a temperature not exceeding 30° C. Approximately half of the dimethyl acetamide was evaporated so that a viscous syrup suitable for casting was obtained.

A 10 mil film was cast from the solution on aluminum foil and placed in an air circulation oven at 25° C. The oven was heated to 300° C. in 45 minutes to cure the film. The foil was dissolved in hydrochloric acid and the polymer film washed with water and dried.

The film was amber colored, tough, flexible and nonflammable.

EXAMPLE 3

To a 200 ml. flask equipped as in Example 1, was added 6.70 g (0.020 moles) of 2-dimethylamino-4,6-bis(m-aminoanilino)-s-triazine dissolved in 70 ml of anhydrous dimethyl acetamide. Solid benzophenone tetracarboxylic dianhydride, 6.42 g., (0.020 moles), was slowly added to the stirred solution. The solution became more viscous and the temperature increased to 33° C.

The clear dimethylacetamide solution was added dropwise over a 45 minute period to a 2 liter flask containing 10 ml concentrated ammonium hydroxide dissolved in 1,500 ml of isopropanol. During the addition the mixture was agitated with a "Lighting Mixer." The precipitated ammonium salt of the polyamic acid was filtered off and washed with isopropanol and diethyl ether. This salt was dried at 45° C. under vacuum.

The polyamic acid salt was dissolved in water to yield a 15 percent solution. Films were cast and cured directly to yield a polyimide coating on a metal sheet. Films of better clarity and physical properties were obtained if 1 to 15 percent by volume of dimethyl formamide was added to the aqueous solution.

EXAMPLE 4

To a 200 ml flask equippred as in Example 1, was charged 2.3 g. (0.005 moles) of 2-diphenylamino-4,6-bis(m-aminoanilino)-s-triazine dissolved in 40 ml of N-methyl pyrrolidone. Solid benzophenone tetracarboxylic dianhydride, 1.53 g. (0.005 moles), was slowly added to the stirred solution. The solution became more viscous and the temperature increased to 30° C.

This polyamic acid had an inherent viscosity of 0.72. The ammoniated polyamic acid from this run required a 50/50 mixture of water and dimethyl acetamide to form a homogeneous solution.

A film was cast of the polyamic acid from N-methyl pyrrolidone solution and cured at 300° C. for 1 hour. This film was isothermally aged in air at 300° C. After 500 hours the film was still flexible and retained 96 percent of its original weight.

EXAMPLE 5

To a 200 ml flask equipeed as in Example 2, was charged 4.6 g. (0.01 moles) of 2-diphenylamino-4,6-bis(m-aminoanilino)-s-triazine dissolved in 50 ml of anhydrous dimethyl acetamide. To the stirred solution were added 2.27 g. (0.0104 moles) of solid pyromellitic dianhydride while the reaction temperature was maintained below 30° C.

A film was cast of the polyamic acid from the dimethyl acetamide solution and cured at 300° C. for 1 hour. This film was isothermally aged in air at 300° C. for 666 hours and was found to be still flexible and tough having retained 94 percent of its original weight.

EXAMPLE 6

2-Diphenylamino-4,6-bis(4,4'-aminooxydianilino)-s-triazine was reacted with a stoichiometric equivalent of pyromellitic dianhydride in dimethylacetamide by the procedure described in Example 5. The cured polyimide film which was initially flexible becamse embrittled after 240 hours of isothermal aging at 300° C. in air.

EXAMPLE 7

2-Phenyl-4,6-bis(m-aminoanilino)-s-triazine was reacted with a stoichiometric equivalent of benzophenone tetracarboxylic dianhydride by the procedure described in Example 5. The cured polyimide film was flexible and after 1,300 hours of isothermal aging in air at 300° C. retained 92.4 percent of its original weight.

The polyamic acid from the room temperature reaction of 2-phenyl-4,6-bis(m-aminoanilino)-s-triazine and benzophenone tetracarboxylic dianhydride of inherent viscosity 1.1 was precipitated and the ammonium salt in water prepared. Films cast from water and cured at 300° C. retained 91 percent of their initial weight after isothermal aging for 500 hours in air at 300° C.

EXAMPLE 8

2-Amino-4,6-bis(m-aminoanilino)-s-triazine was reacted with a stoichiometric equivalent of pyromellitic dianhydride by the procedure described above in Example 5. The polyamic acid of inherent viscosity 0.89 was cast as a film on polyethylene and the dried film was removed from the polyethylene and cured at 300° C. for 1 hour. The cured film did not show loss in weight before 450° C. when a thermogravimetric analysis was run in air at a heating rate of 20° C. per minute. Upon isothermal aging in air at 300° C. the film retained 86 percent of its original weight for 330 hours.

EXAMPLE 9

In a 1 liter three-necked flask equipped with a nitrogen purge, stirrer and thermometer was charged 109.7 g. of 2-diphenylamino-bis(4,6-m-aminoanilino)-s-triazine dissolved in anhydrous dimethyl acetamide. The solution was cooled to 10°–15 C. and 64.4 g. of benzophenone tetracarboxylic dianhydride was added in three equal portions at a rate so that the reaction temperature did not go above 20° C. After 45 minutes of stirring a 20 percent solids polyamic acid solution was produced. The intrinsic viscosity of the polyamic acid was 0.51.

This solution was used to impregnate 181 E glass fabric (A1100 amino silane finish). The fabric was twice passed through the solution and then through coater rolls with a 16 mil gap. The impregnated fabric was heated at 150° C. for 1 minute to reduce the solvent content to 12 percent and then cut into 5 × 5" squares for laminating. An 18 ply laminate was prepared (five impregnated plys for one dry ply of 181 E) by heating in a press at 750 psi at 500° C. for one-half hour followed by one-half hour at 600° C. a light colored laminate of great rigidity and excellent color was produced.

EXAMPLE 10

2-N-methylanilino-bis(4,6-ortho aminoanilino)-s-triazine (0.03 moles) 10.1 g. and benzophenone tetracarboxylic dianhydride (0.03 moles) 9.66 g. is reacted together at room temperature with stirring in 96 ml of anhydrous DMAC. When a film of the resulting polyamic is cast and heated to 300° C. a stiff, yellow polyimide film is produced.

EXAMPLE 11

2-Amino-bis(4,6paraaminoanilino)-s-triazine (0.03 moles) 9.25 g. and pyrazine tetracarboxylic dianhydride (0.03 moles) 6.6 g. is reacted together at room temperature with stirring in 70 ml of anhydrous dimethyl acetamide. The dimethyl acetamide is removed by heating the solution under vacuum and the precipitated solid is isolated and heated to 300° C. under nitrogen to fully convert it into the corresponding polyimide. When this polyimide is heated in air to 500° C. the weight loss is very slight.

EXAMPLE 12

2-Anilino-bis(4,6 paraaminoanilino)-s-triazine (0.3 moles), 115 g. and 1,4,5,8-naphthalentetracarboxylic dianhydride (0.3 moles) 80.5 g. are reacted together at room temperature, with stirring in 900 ml of anhydrous N-methyl pyrrolidone. This solution is used to impregnate 181 E glass fabric cloth containing a 1100 finish (amino silane) by passing the cloth twice through the polyamic acid solution. The saturated glass fabric cloth is heated for 75 minutes at 120° C. in an air oven to B-stage the resin. The resulting prepreg is cut into 5 × 5 inch sheets and an 18 ply laminate prepared by using a dry ply of glass fabric for every five plys of prepreg. Initial contact in the press for 1 ½ minutes at 10 p s i and 600° F. is used followed by a cure cycle of 30 minutes at 600° F. and 250 p s i The laminate contains 25 percent resin and a very low void content as measured by specific gravity.

EXAMPLE 13

2-Diphenylamino-bis(4,6-meta amino anilino)-s-triazine and benzophenone tetracarboxylic acid dianhydride are reacted together at room temperature with stirring in anhydrous dimethyl acetamide yielding the corresponding polyamic acid.

EXAMPLE 14

2-Piperidino bis(4,6-beta aminoethyl amino)-s-triazine (0.03 moles) 8.4 g. and pyromellitic dianhydride (0.03 moles) 6.54 g. were reacted together at room temperature in 90 ml of dimethyl formamide. The resulting polyamic acid had an inherent viscosity of 0.95. A film of the polyamic acid was cast and cured at 300° C. for 10 minutes. The cured film was transparent and appeared flexible and tough after repeated creasing.

What is claimed is:

1. A polyimide consisting essentially of the recurring unit

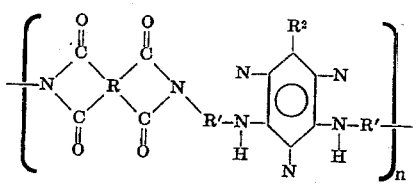

wherein
R is a tetravalent radical containing at least one ring of six carbon atoms, said ring characterized by benzenoid unsaturation, the four carbonyl groups being attached directly to separate carbon atoms in a six membered benzenoid ring of the R radical and each pair of carbonyl groups being attached to adjacent carbon atoms in a ring of the R radical;
R' is a divalent organic radical selected from aromatic, aliphatic and cycloaliphatic series;
  a. ortho, meta and para phenylene, biphenylene, naphthylene, anthracylene,
  b. 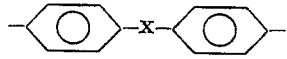
  wherein X is sulfur, oxygen, sulfone, methylene or alkyl or aryl substituted methylene groups
  c. alkylene groups having from two to eight carbon atoms, and
  d. cycloalkyl groups,
$R^2$ is hydrogen, amino, diarylamino, di(lower)alkyl amino, anilino, N-(lower)alkyl anilino, diphenylamino, pyrrolidino, piperidino phenyl or chloro groups;
n is an integer of 5 or more. , said polyimide having been prepared from the corresponding polyamic acid having the inherent viscosity of at least 0.1, measured at 30° C. at a concentration of 0.5 percent by weight of the polymer in a solvent selected from N,N-dimethylacedamide, N-methyl pyrrolidone or dimethyl formamide.

2. A polyimide according to claim 1 wherein said R group has the structure selected from

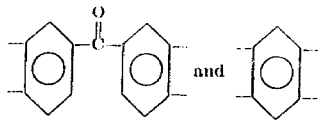

3. A polyimide according to claim 1 wherein said R' is a phenylene.

4. A polyimide according to claim 1 wherein $R^2$ is an amine radical.

5. A polyimide according to claim 1, said polyimide having the recurring unit

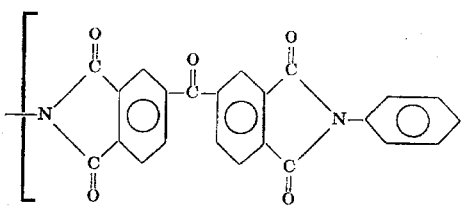

6. A polyimide according to claim 1, said polyimide having the recurring unit

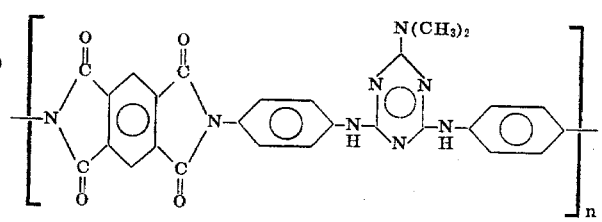

7. A polyamic acid consisting essentially of the recurring unit

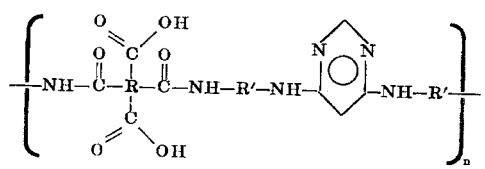

wherein
R,R' and n are as defined in claim 1, said polyamic acid having the inherent viscosity of at least 0.1 measured at 30° C at a concentration of 0.5 percent by weight of the polymer in a solvent selected from N,N-dimethylacetamide, N-methyl pyrrolidone or dimethyl formamide.

* * * * *